(No Model.)

D. H. BULL.
CULTIVATOR.

No. 470,979. Patented Mar. 15, 1892.

WITNESSES
Chapman Fowler
Alex Scott

INVENTOR
Daniel H. Bull
by A. H. Evans & Co
Attorneys

UNITED STATES PATENT OFFICE.

DANIEL H. BULL, OF GREENVILLE, SOUTH CAROLINA.

CULTIVATOR.

SPECIFICATION forming part of Letters Patent No. 470,979, dated March 15, 1892.

Application filed July 28, 1891. Serial No. 400,985. (No model.)

*To all whom it may concern:*

Be it known that I, DANIEL H. BULL, a citizen of the United States, residing at Greenville, in the county of Greenville and State of South Carolina, have invented certain new and useful Improvements in Cultivators, as set forth in the accompanying drawings, forming part of this specification, in which—

Figure 1:
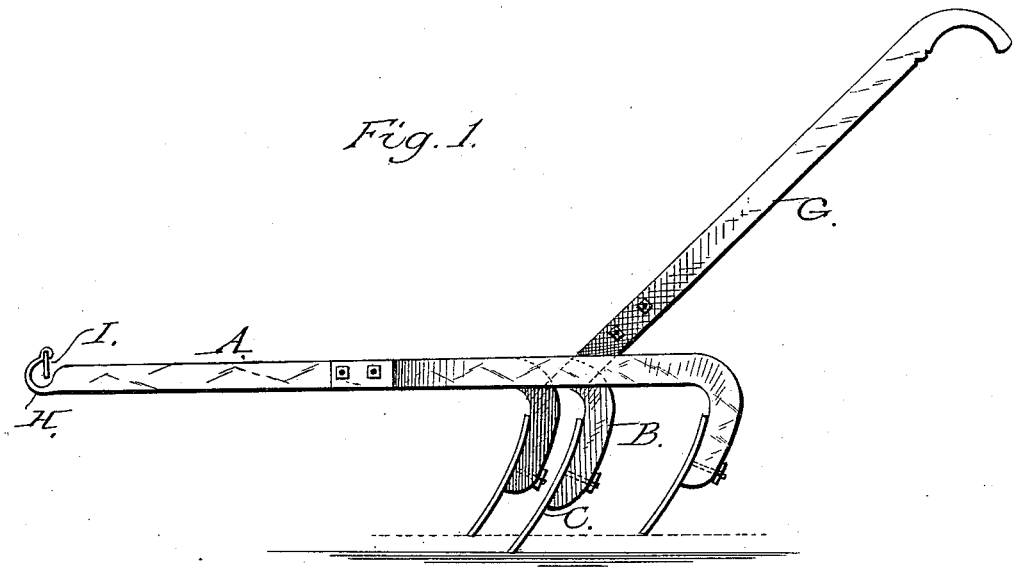
Figure 2:
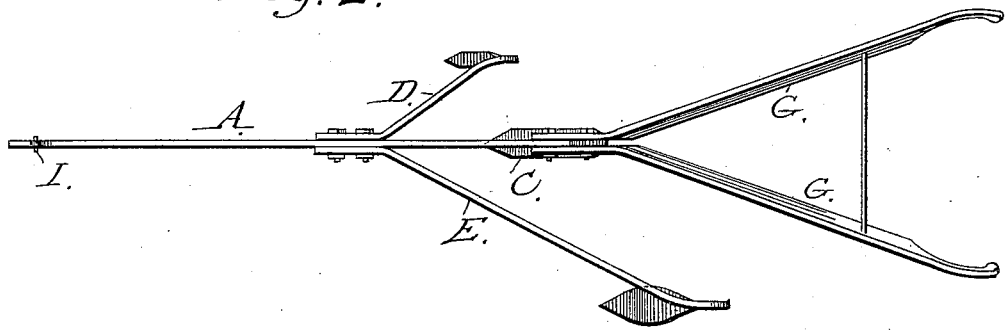

Figure 1 is a side elevation of a cultivator embodying my invention. Fig. 2 is a plan view of the same.

My invention relates to cultivators generally, and particularly to that class adapted for the cultivation of small plants and for garden or orchard purposes; and my invention consists, essentially, in making the middle plow or shovel longer than those upon each side of it, whereby said plow has a deeper penetration than the others and serves as a guide for the other plows or shovels and to steady the machine.

My invention also consists of the constructions and combinations of devices which I shall hereinafter fully describe and claim.

To enable others skilled in the art to which my invention appertains to make and use the same, I will now describe its construction and indicate the manner in which the same is carried out.

In the said drawings, A indicates the main beam, having its rear end bent downward to form the standard B, to which a plow or shovel C, of any well-known form, is secured. To one side of the main beam is bolted a supplemental beam D, having a plow or shovel of any suitable form secured to its standard, and to the opposite side of said main beam is another supplemental beam E, whose standard is also provided with a plow or shovel, the said supplemental beams extending rearwardly and outwardly and being of unequal lengths, and the plows or shovels being of the same or of varying widths, as may be desired.

In carrying out my invention I make the standard of the central or main beam slightly longer than those upon each side of it, so that its plow or shovel will not only penetrate the soil to a greater depth than the other plows or shovels, but will serve as a guide for the latter and also make the machine run a much straighter course and more steadily than if the plows or standards were in the same horizontal plane.

The handles G are secured to the rear of the main standard, and the front end of said standard is formed with a hooked portion H for the attachment of the draft appliances. In the outer end of this hooked portion H is loosely mounted a gravitating link or ring I, which serves to retain the draft attachment in position and prevent it working out of its engagement with the beam. When the draft attachment is connected with the hooked end of the beam, the loose link or ring automatically falls back of it to assist in confining it in the hooked portion of the beam; but the ring or link may be forced back, when desired, to enable the draft attachment to be released.

A cultivator constructed as above, with all of its parts of metal, is very simple and light and yet very strong, and being composed of so few pieces it is not liable to get out of order and may be readily repaired when necessary.

Having thus described my invention, what I claim as new, and desire to secure by Letters Patent, is—

An improved cultivator consisting of a main beam having a standard with a plow or shovel thereon, a supplemental beam at one side of the main beam having a shovel or plow lying in a plane above and in front of the plow or shovel on the main beam, a standard on the opposite side of the main beam having a shovel or plow lying in a plane behind and above the shovel or plow on said beam, whereby the three beams and shovels overlap and the middle shovel operates in a lower plane than the others, means for connecting the front of the main beam with draft appliances, and handles projecting from the rear of said main beam, substantially as herein described.

DANIEL H. BULL.

Witnesses:
GEO. WESTMORELAND,
W. P. CONYERS.